(12) United States Patent
Ho et al.

(10) Patent No.: US 6,576,044 B1
(45) Date of Patent: Jun. 10, 2003

(54) PROCESS FOR THE PURIFICATION OF NITRIC OXIDE

(75) Inventors: Dustin Wenpin Ho, Fremont, CA (US); Deming Tang, Chandler, AZ (US); Walter H. Whitlock, Chapel Hill, NC (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/722,802

(22) Filed: Nov. 27, 2000

Related U.S. Application Data

(63) Continuation-in-part of application No. 09/257,753, filed on Feb. 25, 1999, now abandoned.

(51) Int. Cl.$^7$ .............................................. B01D 53/047
(52) U.S. Cl. ............................. 95/102; 95/105; 95/106; 95/120; 95/129; 95/137; 95/139
(58) Field of Search .......................... 95/118, 119, 128, 95/129, 137, 139, 900, 98, 100–103, 105, 106, 117, 120, 122, 123

(56) References Cited

U.S. PATENT DOCUMENTS

| | | |
|---|---|---|
| 2,568,396 A | 9/1951 | James |
| 3,489,515 A | 1/1970 | Jockers et al. |
| 3,650,090 A | 3/1972 | Temple et al. ............ 95/139 X |
| 3,659,400 A | 5/1972 | Kester ...................... 95/139 X |
| 3,674,429 A | 7/1972 | Collins |
| 3,727,379 A | 4/1973 | Bijleveld et al. ............. 95/137 |
| 3,780,500 A | 12/1973 | Clemens et al. .......... 95/137 X |
| 3,917,469 A | 11/1975 | Cotter et al. ................... 95/137 |
| 4,149,858 A | 4/1979 | Noack et al. .................... 55/73 |
| 4,153,429 A | 5/1979 | Matthews et al. .............. 55/68 |
| 5,158,582 A | 10/1992 | Onitsuka et al. ................ 55/68 |
| 5,417,950 A | 5/1995 | Sheu et al. .............. 423/239.2 |
| 5,514,204 A | 5/1996 | Sheu et al. ..................... 95/92 |
| 5,670,125 A | 9/1997 | Sheu et al. .............. 423/239.2 |
| 5,670,127 A | 9/1997 | Sheu .......................... 423/405 |
| 5,797,979 A | 8/1998 | Quinn ...................... 95/139 X |
| 5,846,297 A | 12/1998 | Schleicher et al. ............ 95/129 |

FOREIGN PATENT DOCUMENTS

| | | | |
|---|---|---|---|
| DE | 3 706 619 | 9/1988 | .................. 95/137 |
| EP | 0 258 747 | 3/1988 | .................. 95/137 |
| SU | 0 806 598 | 2/1981 | .................. 95/129 |
| SU | 0 827 132 | 5/1981 | .................. 95/129 |
| SU | 1 269 814 | 11/1986 | .................. 95/128 |

OTHER PUBLICATIONS

R. Cole et al. "Adsorbing Sulfur Dioxide on Dry Ion Exchange Resins," Industrial and Engineering Chemistry, vol. 52, No. 10, pp. 859–860, Oct. 1960 (copy in 95/137).

*Primary Examiner*—Robert H. Spitzer
(74) *Attorney, Agent, or Firm*—Philip H. Von Neida; Wan Yee Cheung; Salvatore P. Pace

(57) ABSTRACT

A gas mixture comprised of nitric oxide and one or more impurities selected from nitrous oxide, nitrogen dioxide, nitrous acid, sulfur dioxide, carbonyl sulfide, water vapor and carbon dioxide is purified by pressure swing adsorption or temperature swing adsorption using a porous, metal-free polymer adsorbent that does not promote the disproportionation of nitric oxide to nitrogen dioxide and nitrogen or nitrous oxide. The adsorption step is preferably carried out at tempereatures in the range of about –120 to about 0° C.

30 Claims, No Drawings

PROCESS FOR THE PURIFICATION OF NITRIC OXIDE

This is a continuation-in-part application claiming priority based on U.S. patent application Ser. No. 09/257,753 filed Feb. 25, 1999, now abandoned.

FIELD OF THE INVENTION

The present invention is directed to a process for purifying nitric oxide, and more particularly to a process for adsorbing nitrous oxide, nitrogen dioxide, nitrous acid, carbon dioxide, sulfur dioxide, carbonyl sulfide and moisture from a nitric oxide stream by adsorption.

BACKGROUND OF THE INVENTION

Nitric oxide plays an important role in medicine and electronic component manufacture. For example, in the medical field, inhaled nitric oxide helps maintain blood pressure by dilating blood vessels, and kills foreign invaders in the body's immune system. It can be appreciated that it is imperative that the nitric oxide used in such medical applications be of medical grade, i.e., it must not contain more than 5 parts per million by volume (ppm) nitrogen dioxide, and must be substantially free of all other impurities that are harmful to humans, such as slfur dioxide. In electronic applications, nitric oxide is used for nitriding gate oxides in the manufacture of silicon semiconductor devices. The purity requirements for electronic grade nitric oxide are likewise stringent. For example, electronic grade nitric oxide must contain less than about 30 ppm nitrogen dioxide and nitrous oxide. Nitric oxide can be produced by a variety of methods. U.S. Pat. No. 5,670,127, incorporated herein by reference, discloses a particularly desirable nitric oxide manufacturing method which involves the reaction of nitric acid with sulfur dioxide. According to this process aqueous nitric acid is introduced into the top of a trickle bed reactor while sulfur dioxide, introduced into the bottom of the reactor, passes upwardly through the bed. Nitric oxide, produced by reaction of the nitric acid and sulfur dioxide, passes out through the top of the reactor. Water vapor and any sulfur dioxide not consumed in the reaction also pass out of the reactor with the nitric oxide, and thus become impurities in the nitric oxide product gas. Additionally, nitrous oxide and nitrogen dioxide are also impurity byproducts of the process. Many of the above impurities are produced in most other nitric oxide production processes.

Various techniques are employed to remove nitrogen dioxide and sulfur dioxide from the nitric oxide. U.S. Pat. No. 3,489,515 discloses the purification of nitric oxide by washing the nitric oxide with a dilute aqueous solution of nitric acid. The water reacts with the nitrogen dioxide to produce nitric and nitrous acids, which can be washed from the gaseous product stream by washing the stream with water. This method is not satisfactory for producing electronic grade nitric oxide because it does not adequately reduce the concentration of nitrogen dioxide in the product gas stream. Nitrogen dioxide can also be removed from nitric oxide by cryogenic distillation. This method likewise leaves a lot to be desired because of the high capital cost of distillation equipment and because not all of the valuable nitric oxide is recovered during the distillation. Furthermore, liquid nitric oxide is known to be shock-sensitive and has been observed to detonate under certain conditions.

Another nitric oxide purification technique that has been reported is adsorption using various adsorbents. For example, U.S. Pat. No. 5,417,950 discloses the adsorptive removal of nitrogen dioxide and sulfur dioxide from nitric oxide using alumina-deficient type Y zeolite of ZSM5 zeolite as adsorbents; U.S. Pat. No. 5,514,204 discloses the adsorptive separation of nitrogen dioxide and moisture from nitric oxide using metal cation-free silica gel, alumina, or various zeolites, such as types A, X and Y zeolites; and U.S. Pat. No. 5,670,125 discloses the purification of nitric oxide by adsorbing nitrogen dioxide and sulfur dioxide from the nitric oxide using zeolites having a silica to alumina ratio not greater than about 200.

In addition to the above nitric oxide purification methods, adsorption has been used to remove nitrogen oxides (including nitric oxide) and sulfur dioxide from gas streams. U.S. Pat. Nos. 2,568,396 and 4,149,858 disclose the separation of sulfur and nitrogen oxides from use of activated coke or activated charcoal; and U.S. Pat. Nos. 3,674,429 and 4,153,429 disclose the removal of nitrogen oxides from gas streams using zeolites. Oxygen present in or added to the gas streams effects the oxidation of nitric oxide to nitrogen dioxide, and the nitrogen dioxide is adsorbed by the zeolite. The disadvantage of using most of the above adsorbents for the purification of nitric oxide is that they tend to promote the disproportionation of nitric oxide to nitrogen dioxide and nitrogen and/or nitrous oxide, and the oxidation of nitric oxide to nitrogen dioxide.

Because of the importance of producing nitric oxide that is substantially free of nitrogen dioxide, sulfur dioxide and other impurities for medical and electronic applications, highly effective methods for purifying nitric oxide are continuously sought. The present invention provides a simple and efficient method of achieving this objective.

SUMMARY OF THE INVENTION

According to the invention, gaseous impurities are adsorbed from nitric oxide gas using as the adsorbent a porous polymer.

According to a broad embodiment, the invention comprises a method for purifying a nitric oxide gas stream containing one or more gaseous impurities, comprising an adsorption step comprising passing the gas stream through at least one adsorption zone containing a porous, metal-free polymeric adsorbent that is selective for the one or more impurities, thereby adsorbing the one or more impurities from the nitric oxide gas stream and producing purified nitric oxide.

The porous, metal-free polymeric adsorbent that is selective for one or more impurities in the nitric oxide does not promote the disproportionation of nitric oxide to nitrogen dioxide and nitrogen or nitrous oxide, or by promoting the oxidation of nitric oxide to nitrogen dioxide.

The method preferably further comprises an adsorbent regeneration step comprising desorbing the one or more impurities from the adsorbent. More preferably, the adsorption step and the adsorbent regeneration step are steps of cyclic adsorption process. Most preferably, the cyclic adsorption process is pressure swing adsorption, temperature swing adsorption or a combination of these.

The polymeric adsorbent preferably comprises aromatic polymers, heterocyclic polymers, acrylic polymers, acrylic ester polymers, imine polymers, fluorocarbon polymers and combinations thereof.

Generally, the adsorption step of the method is carried out at a temperature in the range of about −200 to about 200° C. and a pressure in the range of about 0.5 to about 50 bara.

According to one preferred embodiment of the invention, the cyclic adsorption process is pressure swing adsorption and the adsorbent regeneration step is carried out at a pressure in the range of about 0.5 to about 5 bar. In this preferred embodiment, the polymeric adsorbent preferably comprises divinylbenzene polymers, styrene polymers, acrylic polymers or combinations thereof. Likewise, in this preferred embodiment, it is preferred that the adsorption step be carried out at a temperature in the range of about −150 to about 100° C. and a pressure in the range of about 1 to about 20 bara. It is also preferred in this preferred embodiment, that the adsorbent regeneration step be carried out at a pressure in the range of about 0.1 to about 2 bara.

According to another preferred embodiment of the invention, the cyclic adsorption process is temperature swing adsorption and the adsorbent is regenerated at a temperature in the range of about −150 to about 300° C. In this preferred embodiment, the polymeric adsorbent preferably comprises divinylbenzene polymers, styrene polymers, acrylic polymers or combinations thereof. Likewise, in this preferred embodiment, it is preferred that the adsorption step be carried out at a temperature in the range of about −150 to about 100° C. and a pressure in the range of about 1 to about 20 bara. It is also preferred in this preferred embodiment, that the adsorbent regeneration step be carried out at a temperature in the range of In a more preferred embodiment of the invention, the polymeric adsorbent is a divinylbenzene polymer comprising polydivinylbenzene, divinylbenzene-styrene copolymer, divinylbenzene-ethylvinylbenzene copolymer, divinylbenzene-acrylonitrile copolymer, divinylbenzene-ethyleneglycol dimethacrylate copolymer, divinylbenzene-4-vinyl-pyridine copolymer, divinylbenzene-polyethyleneimine copolymer, divinylbenzene-N-vinyl-2-pyrrolidinone copolymer, or combinations thereof Likewise, in this more preferred embodiment it is preferred that the adsorption step be carried out at a temperature in the range of about −120 to about 0° C. and a pressure in the range of about 1.5 to about 10 bare. In this preferred embodiment, when the cyclic adsorption process is pressure swing adsorption, it is preferred that the adsorbent regeneration step be carried out at a pressure in the range of about 0.2 to about 1 bara, and when the cyclic adsorption process is temperature swing adsorption, it is preferred that the adsorbent regeneration step be carried out at a temperature in the range of about −50 to about 150° C.

In any of the above embodiments, the adsorbent regeneration step can be at least partly carried out by purging the adsorbent with the purified nitric oxide.

In a first specific embodiment, the invention comprises a method of purifying a substantially oxygen-free nitric oxide gas stream containing at least one gaseous impurity by repeatedly performing the steps:

(a) cocurrently passing the gas stream through at least one adsorption zone containing a porous, metal-free polymeric adsorbent selective for the at least one gaseous impurity at a temperature in the range of about −120 to about 0° C. and a pressure in the range of about 1 to about 20 bara, thereby adsorbing the at least one gaseous impurity and producing impurity-depleted nitric oxide; and (b) countercurrently depressurizing the at least one adsorption zone to a pressure in the range of about 0.05 to about 2 bara, thereby desorbing the at least one gaseous impurity from the adsorbent.

In a preferred aspect of the first specific embodiment, the method further comprises countercurrently purging the at least one adsorption zone with the impurity-depleted nitric oxide. In another preferred aspect of the first specific embodiment, the method further comprises at least partly repressurizing the at least one adsorption zone by countercurrently introducing the impurity-depleted nitric oxide thereinto.

In another preferred aspect of the first specific embodiment, step (b) is at least partly carried out by purging the at least one adsorption zone with heated nonadsorbable gas, and another preferred aspect of this embodiment comprises purging the nonadsorbable gas from the at least one adsorption zone with the impurity-depleted nitric oxide.

In a second specific embodiment, the invention comprises a method of purifying a substantially oxygen-free nitric oxide gas stream containing at least one gaseous impurity by repeatedly performing the steps:

(a) passing the gas stream through at least one adsorption zone containing a porous, metal-free polymeric adsorbent selective for the at least one gaseous impurity at a temperature in the range of about −120 to about 0° C. and a pressure in the range of about 1 to about 20 bara, thereby adsorbing the at least one gaseous impurity and producing impurity-depleted nitric oxide; and (b) desorbing the at least one gaseous impurity from the adsorbent at a temperature in the range of about −50 to about 150° C., thereby regenerating said adsorbent.

In a preferred aspect of the second specific embodiment, step (a) is carried out by cocurrently passing the gas stream through the at least one adsorption zone, and in another preferred aspect of the second specific embodiment, step (b) is at least partly carried out by at least partially purging, preferably countercurrently, the at least one adsorption zone with heated nonadsorbable gas. The second specific embodiment of the invention preferably further comprises purging the nonadsorbable gas from the at least one adsorption zone with the impurity-depleted nitric oxide.

In a preferred aspect of the first and second specific embodiments, the polymeric adsorbent comprises aromatic polymers, heterocyclic polymers, acrylic polymers, acrylic ester polymers, imine polymers, fluorocarbon polymers or combinations thereof Preferably, in either of the above specific embodiments, the method is practiced such that the impurity-depleted nitric oxide contains not more than about 30 ppm each of nitrogen dioxide and sulfur dioxide, and not more than about 1 ppm each of water vapor and carbon dioxide.

The method of the invention is especially useful for removing gaseous impurities selected from nitrous oxide, nitrogen dioxide, nitrous acid, sulfur dioxide, carbonyl sulfide, water vapor, carbon dioxide or mixtures thereof from a nitric oxide gas stream. In preferred embodiments of the invention, it is preferred that the nitric oxide gas stream being purified be substantially oxygen-free.

In another preferred embodiment of the invention, the adsorption method is carried out in a battery of two or more adsorption beds arranged in parallel and operated out of phase, so that when the adsorption step is carried out in one or more adsorption zones, the adsorbent in one or more other adsorption zones is replaced or regenerated.

DETAILED DESCRIPTION OF THE INVENTION

The porous polymeric adsorbents used in the process of the invention for the nitric oxide purification are superior to adsorbents currently used for nitric oxide purification in that they do not cause disproportionation of nitric oxide to nitrous oxide and nitrogen dioxide, nor do they catalyze the oxidation of nitric oxide to nitrogen dioxide. It is not known with certainty why these polymeric materials have these advantages, but it is believed that the metal cations associated with zeolites and other currently used adsorbents promote one or both of these undesirable reactions. The polymeric adsorbents used in the invention are substantially metal-free; accordingly they do not significantly promote nitric oxide disproportionation or oxidation. The term "metal-free", as used herein, means substantially free of metals or metal cations that adversely affect the purification process of the invention by, for example, promoting the disproportionation of nitric oxide to nitrogen dioxide and nitrogen and/or nitrous oxide, or by promoting the oxidation of nitric oxide to nitrogen dioxide.

The porous, metal-free adsorbents of the invention include aromatic polymers, such as styrene and divinylbenzene homopolymers and copolymers, etc.; heterocyclic polymers, such as vinyl pyridine, vinyl pyrolidinone, etc.; acrylic polymers, including methacrylic polymers, such as acrylonitrile, ethyleneglycol dimethacrylate, etc.; polyimines, such as polyethyleneimine; fluorocarbon polymers, such as polytetrafluoroethylene; etc. Typically, these porous polymers have a surface area of about 50 $m^2$/gram or more, and the most useful porous polymers are those having about 200 to about 800 or more $m^2$/gram. Suitable porous polymers include those sold by Hayes Separation Inc. under the trademark series HayeSep®, those sold by Waters Corporation under the trademark series Porapak®, those sold by World Minerals Corp. under the Chromosorb® Century series trademark, those sold by Rohm and Haas under the trademark Amberlite®, and those sold by E. I. dupont de Nemours Company under the trademark Teflon®. Typical polymers suitable for use in the invention are porous polydivinylbenzene, divinylbenzene-styrene copolymer, divinylbenzene-ethylvinylbenzene copolymer, polystyrene, polyacrlic acid, divnylbenzene-acrylonitrile copolymer, divinylbenzene-ethyleneglycol dimethacrylate copolymer, divinylbenzene-4-vinyl-pyridine copolymer, divinylbenzene-polyethyleneimine copolymer, divinyl benzene-N-vinyl-2-pyrrolidinone copolymer, etc.

Preferred polymers are porous divinylbenzene polymers, such as polydivinylbenzene, divinylbenzene-styrene copolymer, divinylbenzene-ethylvinylbenzene copolymer, etc.

The process of the invention can be carried out in a single adsorption vessel or a battery of two or more adsorption vessels, preferably arranged in parallel and adapted to be operated out of phase. The adsorbent may be used once and disposed of, or it may be regenerated and reused. A preferred method of carrying out the invention is a cyclic process comprising adsorption and adsorbent regeneration or adsorbent replacement. It is preferred that the process be carried out in a system comprising two or more adsorption vessels arranged in parallel and operated out of phase, such that one or more adsorption vessels of the system are undergoing adsorption while the adsorbent in one or more other vessels is undergoing regeneration or being replaced. Such an arrangement provides a pseudo-continuous flow of purified gas from the adsorption system. Particularly preferred systems for practice of the invention comprise two adsorption vessels arranged in parallel and operated 180° out of phase.

Suitable cyclic processes for practice of the invention include pressure swing adsorption, PSA, (which includes vacuum swing adsorption (VSA), in which the adsorption step is conducted at atmospheric, superatmospheric or subatmospheric pressures, and the adsorbent regeneration step is carried out by reducing the pressure in the adsorption vessel or vessels that is or are in the regeneration mode to a pressure below the pressure at which the adsorption step is carried out; temperature swing adsorption (TSA), wherein the adsorption step is carried out at a selected temperature, preferably a low temperature, and adsorbent regeneration is carried out by heating the adsorbent in the vessel(s) undergoing adsorbent regeneration to a temperature above the temperature at which the adsorption step is carried out; purge swing adsorption, in which the adsorbent being regenerated is purged with a nonadsorbable or weakly adsorbable gas; and combinations of these.

When the nitric oxide being purified contains very small amounts of gaseous impurities, or when the impurities are very strongly adsorbed by the adsorbent, it may be preferred to use the adsorbent until it becomes saturated with impurities and then dispose of it. On the other hand, when the adsorbent is expensive and/or can be readily regenerated at reduced pressures or elevated temperatures, it is preferable to conduct the nitric oxide purification using PSA, TSA or combinations of these, with or without purging of the adsorbent. PSA is generally preferred when the gas being purified contains significant concentrations of impurities, and TSA is generally preferred when the concentration of impurities in the feed gas is relatively small.

The adsorption step is usually cared out at a temperature above about −200° C., but is preferably carried out at a temperature not lower than about −150° C., and more preferably is carried out at a temperature not lower than about −120° C. At the high end, it is usually carried out at temperatures not above about 200° C., is preferably carried out at a temperature not above about 100° C., and is more preferably carried out at a temperature below about 0° C. In some cases it is preferred that the adsorption step be carried out at or below −30° C.

The pressure at which the adsorption step is carried out can be as low as about 0.5 bara (bar absolute) or less, but it is usually not below about 1 bara, and it is often not below about 1.5 bara At the high end, the adsorption step is usually carried out at pressures not above about 50 bara, and is preferably carried out at pressures not above about 20 bara and is most preferably carried out at pressures not above about 10 bara.

The adsorbent regeneration temperature and pressure of the process of the invention depends upon the type of cyclic process that is practiced. When the adsorption process is PSA the regeneration step is generally carried out at a temperature in the neighborhood of the temperature at which the adsorption step is carried out, and at a pressure below the adsorption pressure. The pressure to which the adsorption vessels is reduced during the regeneration step of PSA cycles of the invention can be as low as 0.05 bara or lower, but is usually not below about 0.1 bara, and is often not below about 0.2 bara, and on the upper end, it is usually not above about 5 bara, and preferably not above about 2 bara and most preferably not above about 1 bara.

When the adsorption process is TSA, bed regeneration is usually carried out at a pressure in the neighborhood of the pressure at which the adsorption step is carried out, and at a temperature above the adsorption temperature. The temperature during the regeneration step of TSA cycles of the invention is usually not above about 300° C., and is preferably not above about 200° C., and is sometimes preferably not above about 150° C., and on the lower end, it is usually not below about −150° C., and preferably not below about −100° C., and most preferably not below about −50° C.

When a combination PSA/TSA process is employed, the temperature and pressure during the bed regeneration step are higher and lower, respectively, than they are during the adsorption step.

In starting a cyclical process according to the invention, the nitric oxide gas stream from which the impurities are to be removed is passed cocurrently (in the direction from the feed inlet end towards the nonadsorbed gas outlet) through the adsorption vessel(s) which are in the adsorption mode. The adsorption vessels are packed with the desired porous polymer adsorbent. As the gas passes through the bed of adsorbent in the adsorption vessel(s), the impurities are adsorbed, and an impurity-depleted nitric oxide product gas passes out of the adsorption vessel through the nonadsorbed gas outlet. As the adsorption step proceeds, impurity fronts of the various impurities contained in the feed gas form in the adsorbent bed and slowly move toward the nonadsorbed gas outlet end of the bed. When the most advanced impurity front reaches a predetermined point in the vessel(s), the adsorption process in the vessel(s) is terminated and these vessel(s) enter the regeneration mode. During regeneration, the impurity-loaded vessels are depressurized, if the adsorption cycle is pressure swing adsorption; heated, if a temperature swing adsorption cycle is employed; or both depressurized and heated, if a combination pressure swing-temperature swing process is used.

As noted above, the method of regeneration of the adsorption beds depends upon the type of adsorption process employed. In the case of pressure swing adsorption, the regeneration phase generally includes a countercurrent depressurization step during which the beds are vented countercurrently (in the direction opposite to the cocurrent direction) until they attain the desired lower pressure. If desired, the pressure in the adsorption vessel(s) can be reduced to subatmospheric pressure by means of a vacuum inducing device, such as a vacuum pump.

In some PSA cycles, in addition to the countercurrent depressurization step(s), it may be desirable to countercurrently purge the bed with a nonadsorbable gas, such as nitrogen, and/or with the purified nitric oxide product gas stream exiting the adsorbent bed(s). In these cases, the purge step is usually initiated towards the end of the countercurrent depressurization step, or subsequent thereto. During this purge step, the purge gas can be introduced into the adsorbent bed from an intermediate nitric oxide storage facility when the adsorption system comprises a single adsorber; or from another adsorber that is in the adsorption phase, when the adsorption system comprises multiple adsorbers arranged in parallel and operated out of phase.

When the adsorption process is TSA, adsorbent regeneration is carried out by heating the adsorbent to the desired regeneration temperature and maintaining it at the desired temperature until the desired degree of adsorbent regeneration is achieved. This can be accomplished by, for example, passing a heated purge gas through the adsorption vessel(s), preferably in the countercurrent direction. Alternatively, or additionally, the adsorption vessel(s) and/or the adsorbent contained therein can be heated using external or internal heating devices, such as heating jackets or heat-conducting immersion rods.

The adsorption cycle may contain steps other than the fundamental steps of adsorption and regeneration. For example, in PSA cycles, when the system comprises one or more pairs of adsorption vessels arranged in parallel and operated under conditions such that one vessel of a pair completes its adsorption step as the other vessel of the pair completes its adsorbent regeneration mode, it may be advantageous to include a bed pressure equalization step, wherein gas is passed from the bed completing its adsorption step to the bed completing its adsorbent regeneration step. Additionally or alternatively, it may be desirable to partially pressurize the vessel(s) completing adsorbent regeneration by passing purified nitric oxide product gas countercurrently thereinto.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a volume basis.

EXAMPLE

A stainless steel cylinder, 24 inches long and 0.75 inches in diameter was packed with 20 ml of Amberlite-XAD-2 resin, a macroreticular styrene-divinylbenzene copolymer in nonionic bead form and having a mean surface area of 300 $m^2$/gram. A one-half inch layer of quartz wool was inserted into the ends of the cylinder to hold the adsorbent in place, and to serve as a filter. The cylinder was then placed in a Dewar flask filled with n-propanol and cooled by liquid nitrogen. A test gas containing 99% NO and about 1000 ppm each of nitrogen dioxide, carbon dioxide and nitrous oxide was pre-cooled and purified by passing it through the packed cylinder. The test gas was introduced into the cylinder at a temperature of $-100$ degree C., a pressure of 30 psig and a flow rate of 350 cc/minute, and the purified gas was collected at an absolute pressure of 762 to 766 torr in a gas cell having an optical path length of 10 meters and a volume of about 1.6 liters. The gas cell was mounted on a Nicolet Magna 750 Fourier Transform Infrared (FTIR) spectrometer which recorded the infrared spectral measurements at a resolution of 0.5 $cm-1$. To obtain a high signal/noise ratio, 32 scans were used. After approximately 20 standard liters of test gas was passed through the packed cylinder, the purified nitric oxide gas exiting the system was found to contain less than 1 ppm each of nitrogen dioxide and carbon dioxide and less than 6 ppm nitrous oxide.

The above example shows that porous styrene-divinylbenzene copolymer is effective for significantly reducing the concentration of nitrogen dioxide, carbon dioxide, and nitrous oxide impurities present in a nitric oxide gas stream to very low levels.

Although the invention has been described with particular reference to a specific example, the example is merely representative of the invention, and variations are contemplated. For instance, mixtures of two or more adsorbents can be used in a single bed or two or more adsorbents can be used in tandem in the process of the invention. The scope of the invention is limited only by the breadth of the appended claims.

What is claimed is:

1. A method of purifying a nitric oxide gas stream containing one or more gaseous impurities comprising an adsorption step comprising passing said gas stream trough at least one adsorption zone containing a porous, metal-free polymeric adsorbent containing at least one of styrene polymers, divinylbenzene polymers, vinyl pyridine polymers, vinyl pyrolidinone polymers, acrylic polymers, acrylic ester polymers, imine polymers, and fluorocarbon polymers, said metal-free polymeric adsorbent being selective for said one or more impurities and does not promote the disproportionation of nitric oxide to nitrogen dioxide and nitrogen or nitrous oxide, thereby adsorbing said one or more impurities from said nitric oxide gas stream and producing purified nitric oxide.

2. The method of claim 1, wherein said adsorption step is carried out at a temperature in the range of about −200 to about 200° C. and a pressure in the range of about 0.5 to about 50 bara.

3. The method of claim 2, further comprising an adsorbent regeneration step comprising desorbing said one or more gaseous impurities from said adsorbent.

4. The method of claim 3, wherein said adsorption step and said adsorbent regeneration step are steps of cyclic adsorption process.

5. The method of claim 4, wherein said adsorbent regeneration step is at least partly carried out by purging said adsorbent with said purified nitric oxide.

6. The method of claim 4, wherein said cyclic adsorption process is pressure swing adsorption, temperature swing adsorption or a combination of these.

7. The method of claim 6, wherein said cyclic adsorption process is pressure swing adsorption and said adsorbent regeneration step is carried out at a pressure in the range of about 0.5 to about 5 bara.

8. The method of claim 7, wherein said polymeric adsorbent comprises at least one of said divinylbenzene polymers, said styrene polymers, said acrylic polymers or combinations thereof.

9. The method of claim 8, wherein said adsorption step is carried out at a temperature in the range of about −150 to about 100° C. and a pressure in the range of about 1 to about 20 bara.

10. The method of claim 9, wherein said adsorbent regeneration step is carried out at a pressure in the range of about 0.1 to about 2 bara.

11. The method of claim 10, wherein said polymeric adsorbent is at least one of said divinylbenzene polymers comprising polydivinylbenzene, divinylbenzene-styrene copolymer, divinylbenzene-ethylvinylbenzene copolymer, divinylbenzene-acrylonitrile copolymer, divinylbenzene-ethyleneglycol dimethacrylate copolymer, divinylbenzene-4-vinyl-pyridine copolymer, divinylbenzene-polyethyleneimine copolymer, divinylbenzene-N-vinyl-2-pyrrolidinone copolymer, or combinations thereof.

12. The method of claim 11, wherein said adsorption step is carried out at a temperature in the range of about −120 to about 0°C. and a pressure in the range of about 1.5 to about 10 bara.

13. The method of claim 12, wherein said adsorbent regeneration step is carried out at a pressure in the range of about 0.2 to about 1 bara.

14. The method of claim 6, wherein said cyclic adsorption process is temperature swing adsorption and said adsorbent is regenerated at a temperature in the range of about −150 to about 300° C.

15. The method of claim 14, wherein said polymeric adsorbent comprises at least one of said divinylbenzene polymers, said styrene polymers, said acrylic polymers or combinations thereof.

16. The method of claim 15, wherein said adsorption step is carried out at a temperature in the range of about −150 to about 100° C. and a pressure in the range of about 1 to about 20 bara.

17. The method of claim 16, wherein said adsorbent regeneration step is carried out at a temperature in the range of about −100 to about 200° C.

18. The method of claim 17, wherein said polymeric adsorbent is at least one of said divinylbenzene polymers comprising polydivinylbenzene, divinylbenzene-styrene copolymer, divinylbenzene-ethylvinylbenzene copolymer, divinylbenzene-acrylonitrile copolymer, divinylbenzene-ethyleneglycol dimethacrylate copolymer, divinylbenzene-4-vinyl-pyridine copolymer, divinylbenzene-polyethyleneimine copolymer, divinylbenzene-N-vinyl-2-pyrrolidinone copolymer, or combinations thereof.

19. The method of claim 18, wherein said adsorption step is carried out at a temperature in the range of about −120 to about 0° C. and a pressure in the range of about 1.5 to about 10 bara.

20. The method of claim 19, wherein said adsorbent regeneration step is carried out at a temperature in the range of about −50 to about 150° C.

21. The method of claim 2, carried out in a battery of two or more adsorption zones arranged in parallel and operated out of phase, and wherein when the adsorption step is carried out in one or more adsorption zones, the adsorbent in one or more other adsorption zones is replaced or regenerated.

22. A method of purifying a substantially oxygen-free nitric oxide gas stream containing at least one gaseous impurity by repeatedly performing the steps:

(a) cocurrently passing said gas stream through at least one adsorption zone containing a porous, metal-free polymeric adsorbent selective for said at least one gaseous impurity and does not promote the disproportionation of nitric oxide to nitrogen dioxide and nitrogen or nitrous oxide at a temperature in the range of about −120 to about 0° C. and a pressure in the range of about 1 to about 20 bara, thereby adsorbing said at least one gaseous impurity and producing impurity-depleted nitric oxide; and (b) countercurrently depressurizing said at least one adsorption zone to a pressure in the range of about 0.05 to about 2 bara, thereby desorbing said impurity from said adsorbent.

23. The method of claim 22, further comprising countercurrently purging said at least one adsorption zone with said impurity-depleted nitric oxide.

24. The method of claim 22, further comprising at least partly repressurizing said at least one adsorption zone by countercurrently introducing said impurity-depleted nitric oxide thereinto.

25. A method for purifying a substantially oxygen-free nitric oxide gas stream containing at least one gaseous impurity by repeatedly performing the steps:

(a) passing said gas stream through at least one adsorption zone containing a porous, metal-free polymeric adsorbent selective for said at least one gaseous impurity and does not promote the disproportionation of nitric oxide to nitrogen dioxide and nitrogen or nitrous oxide at a temperature in the range of about −120 to about 0° C. and a pressure in the range of about 1 to about 20 bara, thereby adsorbing said at least one gaseous impurity and producing impurity-depleted nitric oxide; and (b) desorbing said at least one gaseous impurity from said adsorbent at a temperature in the range of about −50 to about 150° C., thereby regenerating said adsorbent.

26. The method of claim 25, wherein said polymeric adsorbent comprises aromatic polymers, heterocyclic polymers, acrylic polymers, acrylic ester polymers, imine polymers, fluorocarbon polymers or combinations thereof.

27. The method of claim 25 wherein said at least one gaseous impurity comprises nitrous oxide, nitrogen dioxide, nitrous acid, sulfur dioxide, carbonyl sulfide, water vapor, carbon dioxide or mixtures thereof.

28. The method of claim 25, wherein said impurity-depleted nitric oxide contains not more than about 30 ppm each of nitrogen dioxide and sulfur dioxide, and not more than about 1 ppm each of water vapor and carbon dioxide.

29. The method of claim 25 wherein step (b) is at least partly carried out by purging said at least one adsorption zone with heated nonadsorbable gas.

30. The method of claim 29, further comprising purging said nonadsorbable gas from said at least one adsorption zone with said impurity-depleted nitric oxide.

* * * * *